P. ZABRENAS.
SAFETY BOTTLE HOLDER.
APPLICATION FILED APR. 18, 1912.
1,050,709.
Patented Jan. 14, 1913.
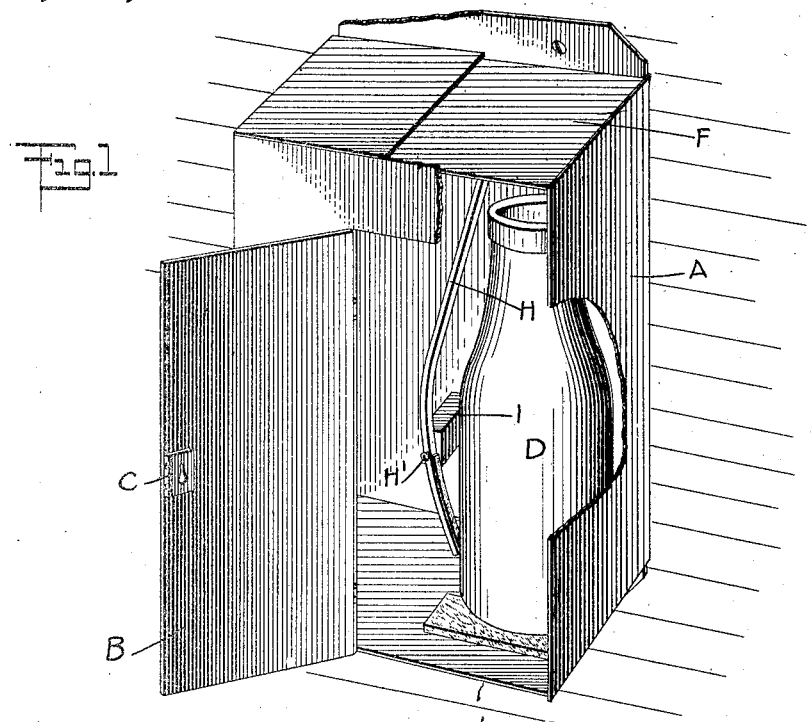
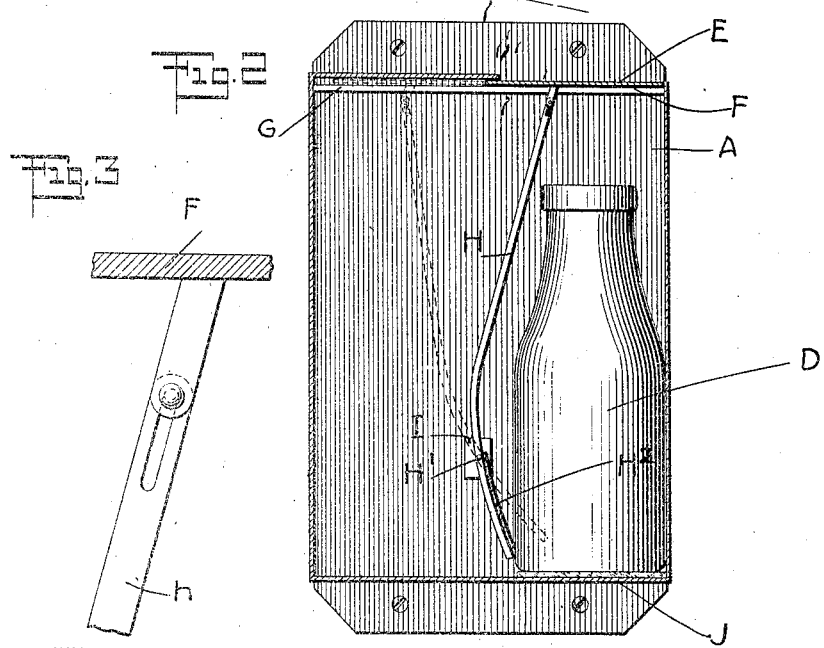
WITNESSES
INVENTOR
Peter Zabrenas
BY
ATTORNEYS

UNITED STATES PATENT OFFICE.

PETER ZABRENAS, OF NEW YORK, N. Y., ASSIGNOR OF ONE-HALF TO ANDREW M. MARTUS, OF BROOKLYN, NEW YORK.

SAFETY BOTTLE-HOLDER.

1,050,709.

Specification of Letters Patent. Patented Jan. 14, 1913.

Application filed April 13, 1912. Serial No. 691,691.

*To all whom it may concern:*

Be it known that I, PETER ZABRENAS, a subject of the Czar of Russia, and a resident of the city of New York, borough of Brooklyn, in the county of Kings and State of New York, have invented a new and Improved Safety Bottle-Holder, of which the following is a full, clear, and exact description.

The object of the invention is to provide a new and improved safety bottle holder which is very simple and durable in construction, composed of comparatively few parts, not liable to get out of order, and arranged to permit the milkman to readily place a bottle of milk into the holder and to prevent unauthorized persons from surreptitiously removing the bottle from the holder.

For the purpose mentioned use is made of a casing provided on top with an opening for the introduction of a bottle of milk or the like, a sliding cover adapted to close the said opening, a door on the casing and adapted to be locked thereto, and an operating and locking lever fulcrumed within the casing and connected at its upper end to the said sliding cover, the lower end of the lever being adapted to abut against one side of the bottle placed into the casing through the said top opening at the time the cover is open.

A practical embodiment of the invention is represented in the accompanying drawings forming a part of this specification, in which similar characters of reference indicate corresponding parts in all the views.

Figure 1 is a perspective view of the safety bottle holder with the door in open position and parts of the casing broken out; Fig. 2 is a sectional side elevation of the same; and Fig. 3 is an enlarged sectional side elevation of part of the sliding cover and its connection with the operating lever.

A suitably constructed casing A is provided at the front with a door B having a lock C or other locking device for locking the door in closed position so that the door can only be opened by the authorized person having the proper key for unlocking the door whenever it is desired to remove the bottle of milk D from the casing A. The bottle of milk D is placed into the casing A through an opening E in the top of the casing, and the said opening E is controlled by a sliding cover F mounted to slide in suitable guideways G arranged within the casing A below the top thereof, as plainly shown in Fig. 2. The under side of the cover F is pivotally connected to the upper end of a lever H fulcrumed at H' on a bracket I attached to the back of the casing A, and the lower end of the lever H is adapted to abut against one side of the bottle D when the latter is placed into the casing through the top opening E at the time the cover F is opened. When the door B of the casing A is locked and a bottle is to be placed by the milkman within the casing then it is only necessary for the milkman to slide the cover F to the left into an open position so that the opening E is uncovered to permit the milkman to drop the bottle through the said opening into the casing A. Now the bottle in dropping strikes the lower end of the lever H as said lower end projects into the path of the bottle, and consequently the bottle in striking the lower end of the lever H imparts a swinging motion to the same, whereby the cover F is moved into closed position thus closing the top of the casing A, and when the bottle D is finally resting on the bottom of the casing the lower end of the lever H abuts against the inner side of the bottle D whereby the lever H is held locked in this position and consequently the cover F is likewise locked in closed position over the opening E.

It will be noticed that by the arrangement described the cover F cannot be opened as long as the bottle D is in position within the casing A, and consequently the bottle cannot be abstracted by unauthorized persons. The owner or other authorized person on unlocking and opening the door B can remove the bottle D from the casing.

The lower end of the lever H is preferably provided with a lining H², of felt or other soft material, and the bottom of the casing is likewise provided with a seat J of felt or other soft material, to prevent breaking of the bottle when dropping the same into the casing through the opening E, as above explained.

Having thus described my invention, I claim as new and desire to secure by Letters Patent:

1. A safety bottle holder, comprising a casing having an opening for the introduction of the bottle, a sliding cover for closing the said opening, a door for said casing adapted to be locked in closed position, and a lever fulcrumed in the casing and pivotally connected at one end with the said sliding cover, the other end being adapted to abut against one side of the bottle placed into the casing through the said opening.

2. A safety bottle holder, comprising a casing provided with a top opening and with a door adapted to be locked in closed position, a guideway in the upper end of the casing, a cover slidable in the said guideway to open and close the said top opening, an upright lever spaced from one side of the casing and fulcrumed in the casing at a point between its upper and lower ends, the upper end of the lever being pivotally connected with the under side of the said cover, the lower end of the lever being adapted to engage the side of the bottle introduced into the casing through the said top opening.

3. A safety bottle holder, comprising a casing having an opening in the top for the introduction of a bottle, a sliding cover for closing the said opening, a door at the front of the casing adapted to be locked in closed position, a bracket within the casing and attached to the back thereof, and a lever fulcrumed on said bracket and connected at its upper end to the under side of the sliding cover, the lower end of said lever being adapted to abut against one side of the bottle when the latter is placed in the casing through the top opening.

In testimony whereof I have signed my name to this specification in the presence of two subscribing witnesses.

PETER ZABRENAS.

Witnesses:
  Jos. GEDMIN,
  J. J. PAUKSZTIS.